United States Patent
Lim et al.

(10) Patent No.: US 10,987,990 B2
(45) Date of Patent: Apr. 27, 2021

(54) SEMI-ACTIVE ANTI-ROLL STABILIZER BAR

(71) Applicant: DAEWON KANG UP CO., LTD., Chungcheongnam-do (KR)

(72) Inventors: Man Seung Lim, Gyeonggi-do (KR); Jin Young Kim, Gyeonggi-do (KR); Sang Eun Bae, Seoul (KR)

(73) Assignee: DAEWON KANG UP CO., LTD., Chungcheongnam-do (KR)

( * ) Notice: Subject to any disclaimer, the term of this patent is extended or adjusted under 35 U.S.C. 154(b) by 83 days.

(21) Appl. No.: 16/406,420

(22) Filed: May 8, 2019

(65) Prior Publication Data

US 2020/0070617 A1 Mar. 5, 2020

(30) Foreign Application Priority Data

Aug. 31, 2018 (KR) .................. 10-2018-0103686

(51) Int. Cl.
 *B60G 21/055* (2006.01)
(52) U.S. Cl.
 CPC .... *B60G 21/0558* (2013.01); *B60G 2202/135* (2013.01); *B60G 2206/427* (2013.01)
(58) Field of Classification Search
 CPC .............. B60G 21/055; B60G 21/0553; B60G 21/0558; B60G 2202/135; B60G 2206/427
See application file for complete search history.

(56) References Cited

U.S. PATENT DOCUMENTS

| 5,027,667 | A | * | 7/1991 | Weyer | ............... F16H 25/2266 |
| | | | | | 74/424.92 |
| 6,022,030 | A | * | 2/2000 | Fehring | .............. B60G 21/0553 |
| | | | | | 267/277 |
| 7,207,574 | B2 | * | 4/2007 | Gradu | ................ B60G 21/0555 |
| | | | | | 267/277 |
| 8,690,174 | B2 | * | 4/2014 | Grau | ........................ F16D 3/68 |
| | | | | | 280/124.107 |
| 9,878,589 | B2 | * | 1/2018 | Park | ................... B60G 21/0558 |
| 10,377,201 | B2 | * | 8/2019 | Holzberger | ............... F16D 3/68 |
| 2017/0106714 | A1 | * | 4/2017 | Yang | .................. B60G 21/0558 |
| 2018/0086172 | A1 | * | 3/2018 | Breton | .............. B60G 21/0555 |
| 2020/0198435 | A1 | * | 6/2020 | Dhanraj | ............. B60G 17/0277 |
| 2020/0376919 | A1 | * | 12/2020 | Lim | ..................... B60G 21/106 |

FOREIGN PATENT DOCUMENTS

| GB | 2275661 A | * | 9/1994 | ......... B60G 17/0162 |
| JP | 2011031735 A | * | 2/2011 | |
| KR | 20170086962 A | * | 7/2017 | |

* cited by examiner

*Primary Examiner* — Laura Freedman
(74) *Attorney, Agent, or Firm* — Mayer & Williams PC

(57) ABSTRACT

A semi-active anti-roll stabilizer bar capable of controlling the stiffness thereof by virtue of the elastic force of a spring is disclosed. When the stabilizer bar is rotated during general travelling, the stabilizer bar has roll stiffness attributable to the repulsive force due to the spring constant thereof. When the stabilizer bar is greatly rotated during turning of the vehicle, the springs are closely compressed, with the result that the stabilizer bar has the same high stiffness as that of a general stabilizer bar.

5 Claims, 10 Drawing Sheets

SEMI-ACTIVE ANTI-ROLL STABILIZER BAR

BACKGROUND OF THE INVENTION

Field of the Invention

The disclosure relates to a semi-active anti-roll stabilizer bar capable of controlling the stiffness thereof by virtue of the elastic force of a spring.

Description of the Related Art

A stabilizer bar, which is generally used in vehicles, is configured so as to extend in the transverse direction of a vehicle body, and is mounted on the lower portion of the vehicle so as to connect right and left wheels to each other.

When a vehicle travels on a road, in particular, a curved road, the vehicle is subjected to a rolling phenomenon due to lateral acceleration attributable to centrifugal force. At this time, a stabilizer bar functions to prevent the wheel of the vehicle that is positioned inwards in the radial direction of the curved road from being separated from the road surface to thus ensure driving stability.

Preferably, the stabilizer bar has high stiffness in order to keep the wheels in contact with the road surface with the goal of preventing turnover due to rolling, that is, in the interests of safety. Meanwhile, when there is no safety problem, for example, when a vehicle travels on a straight road, it is preferable that there be little or no stiffness so as to minimize the transfer of the load of the wheels to the vehicle body to secure good ride comfort.

In other words, it is preferable that the stiffness of a stabilizer bar be controlled to be maintained at a very low level until the torsional angle of the stabilizer bar reaches a predetermined angle, that is, while travelling on a straight road, but to be increased after the torsional angle exceeds the predetermined angle.

Among conventional stabilizer bars, there is a stabilizer bar, which is manufactured in such a way as to cut a single round bar or pipe to an appropriate length, to form the cut material into a desired shape and to perform heat treatment, shot peening, painting and the like.

Such a stabilizer bar, which is manufactured from a single piece of material, has advantages of easy manufacture and low manufacturing costs but has a disadvantage in that the stiffness of the stabilizer bar cannot be controlled because the inherent stiffness of the stabilizer bar is consistently applied.

An active anti-roll stabilizer bar, which is divided into right and left stabilizer bars with an actuator disposed therebetween, has been developed and is in use.

The actuator functions to control the torsion of the stabilizer bar by converting electric energy into mechanical force using an electric motor, a hydraulic motor or the like. In other words, the actuator controls the stiffness of the stabilizer bar in such a way as to provide a rotating force with the right or left stabilizer bar against a twist thereof induced by a lift of a right or left wheel.

Such an active anti-roll stabilizer bar has an advantage of being capable of improving the running stability and ride quality of a vehicle by appropriately controlling the stiffness of the stabilizer bar depending on the circumstances.

However, because such an active anti-roll stabilizer bar has a complicated structure, there are many disadvantages, such as increased manufacturing costs due to difficulty in manufacture and necessity of sensors and a controller and difficulty ensuring sufficient space to mount the actuator in a vehicle due to a large size of the actuator.

In addition, because the sensor required to determine the point of time at which stiffness has to be controlled is a load sensor, there is a disadvantage whereby it is impossible to change stiffness in consideration of the torsional angle of the stabilizer bar.

Furthermore, such an active anti-roll stabilizer bar can be applied only to expensive vehicles but not to mid- or low-priced vehicles owing to problems with cost and weight.

Demand for safety and ride quality is increasing every day. For this reason, there is demand for a novel stabilizer bar, which is manufactured at lower cost and weight, which varies in stiffness depending on running circumstances and which is suitable for mid or low-priced vehicles.

SUMMARY OF THE INVENTION

At least one embodiment of the present invention solves at least one of the above mentioned problems of the conventional anti-roll stabilizer.

An embodied stabilizer bar varies in stiffness in a semi-active manner depending on running circumstances, without having to provide a sensor and an actuator, unlike an active anti-roll stabilizer bar.

Furthermore, the stiffness varies according to a torsional angle of the stabilizer bar, not according to a lateral acceleration of a vehicle.

The stiffness of the stabilizer bar is low when the torsional angle of the stabilizer bar is small, that is, when the associated vehicle travels on a straight road, and thus the stabilizer bar gently deforms to provide a good ride quality.

The torsional stiffness is increased to be high so as to prevent turnover of the vehicle when a rolling force of the vehicle body reaches a certain level or higher on a curved road.

One embodied semi-active anti-roll stabilizer bar includes an outer housing, an inner housing, at least one elastic element, a rotational bearing, a first step bar and a second step bar.

The outer housing may include a hollow cylindrical accommodation space therein.

The inner housing may be disposed in the accommodation space.

The inner housing may have a diameter smaller than that of the accommodation space.

The elastic element may be disposed between the outer housing and the inner housing. When the outer housing and the inner housing are rotated relative to each other, the elastic element may be elastically deformed thereby exerting elastic force in a direction opposite the rotational direction of the outer housing.

A rotational bearing may be disposed between the outer housing and the inner housing.

The first step bar may be connected at one end thereof to one wheel of a vehicle and may be connected at the other end thereof to the outer housing so as to be rotated therewith.

The second step bar may be connected at one end thereof to one wheel of a vehicle and may be connected at the other end thereof to the inner housing so as to be rotated therewith.

One of the outer housing and the inner housing may include an elastic element receptor for receiving the elastic element, and the other of the outer housing and the inner housing may include a support adapted to support one end of the elastic element, which is elastically deformed when the outer housing and the inner housing are rotated relative to each other.

The elastic element receptor may include a first elastic element receptor, which is positioned in a counterclockwise direction from the support, and a second elastic element receptor, which is positioned in a clockwise direction from the support.

The elastic element may include a first elastic element and a second elastic element. The first elastic element may be disposed in the first elastic element receptor and may be compressed, thereby exerting elastic force in the clockwise direction when the outer housing is rotated in the counterclockwise direction.

The second elastic element may be disposed in the second elastic element receptor and may be compressed, thereby exerting elastic force in the counterclockwise direction when the outer housing is rotated in the clockwise direction.

The support may be formed on one housing of the inner and outer housings, and the elastic element receptors may be formed in the other housing.

Each of the first and second elastic elements may include a plurality of elastic elements. The ends of the plurality of first elastic elements and the plurality of second elastic elements that are positioned at the support may be angularly spaced apart from the support at different angles.

At least one elastic element may include an outer coil spring and an inner coil spring disposed in the outer coil spring.

The ends of the plurality of first elastic elements that are positioned at the support may be disposed in a stepwise fashion such that the plurality of first elastic elements are compressed in stages one by one when the support is rotated in the counterclockwise direction.

The ends of the plurality of second elastic elements that are positioned at the support may be disposed in a stepwise fashion such that the plurality of second elastic elements are compressed in stages one by one when the support is rotated in the clockwise direction.

The plurality of first elastic elements may have the same length, and the other opposite ends of the plurality of first elastic elements that are positioned opposite the support may also be disposed in a stepwise fashion.

The plurality of second elastic elements may have the same length, and the other opposite ends of the plurality of second elastic elements that are positioned opposite the support may also be disposed in a stepwise fashion.

The first elastic receptor may include a first recess, which is configured such that two ends of the first elastic element are supported by both ends of the first recess and at least a portion of the first elastic element in a width direction projects radially outwards from the inner housing.

The second elastic receptor may include a second recess, which is configured such that two ends of the second elastic element are supported by both ends of the second recess and at least a portion of the second elastic element in a width direction projects radially outwards from the inner housing.

At least first or second elastic element may include a coil spring, and the first or second elastic element receptor may be configured so as to support half or more of a width of one end of the coil spring.

BRIEF DESCRIPTION OF THE DRAWINGS

The above and other objects, features and other advantages of an embodied stabilizer bar will be more clearly understood from the following detailed description taken in conjunction with the accompanying drawings, in which.

DETAILED DESCRIPTION OF THE INVENTION

Hereinafter, a semi-active anti-roll stabilizer bar according to an embodiment of the present invention will be described with reference to the accompanying drawings.

Figure 1:
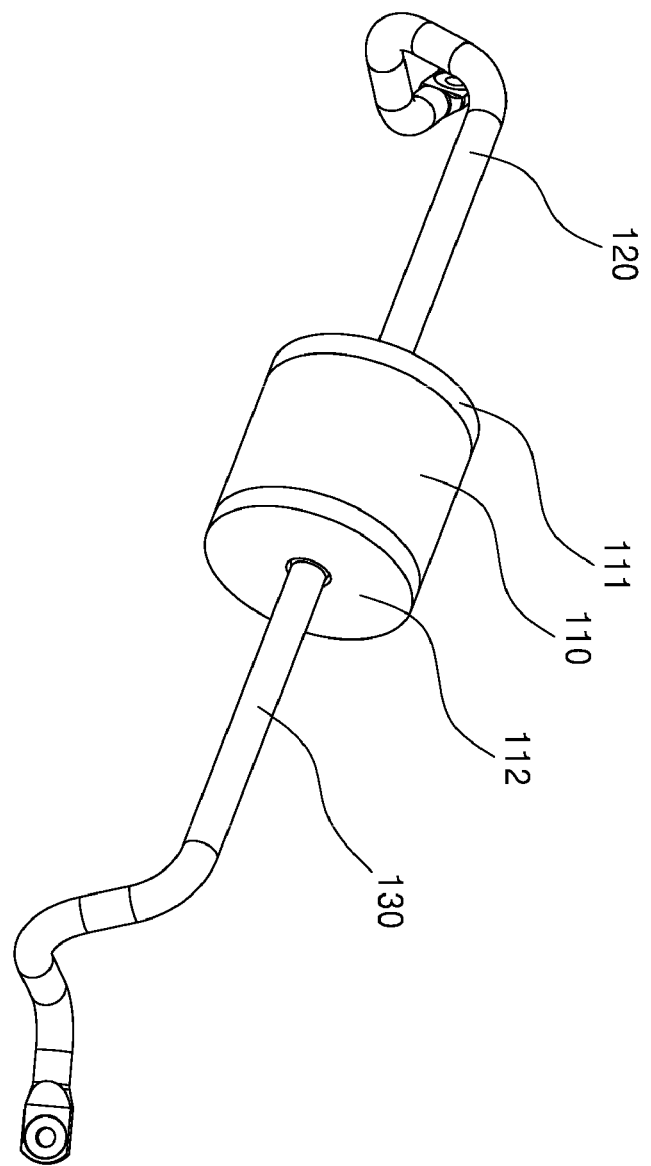
FIG. 1 is a view illustrating a semi-active anti-roll stabilizer bar according to an embodiment of the present invention.
Figure 2:
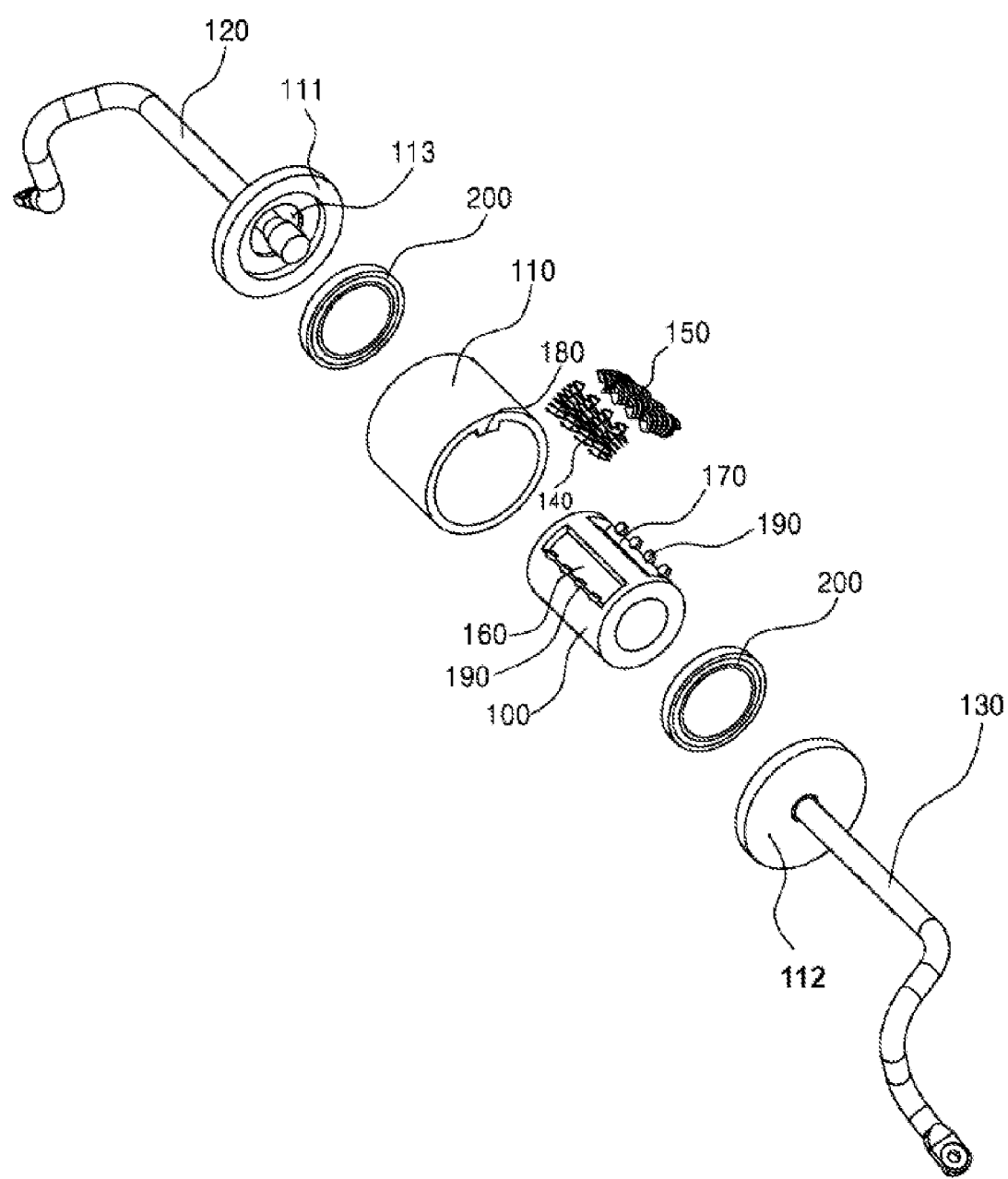
FIG. 2 is an exploded view of the semi-active anti-roll stabilizer bar according to the embodiment of the present invention.

As illustrated in FIGS. 1 and 2, the semi-active anti-roll stabilizer bar according to the embodiment of the present invention includes an outer housing 110, an inner housing 100, elastic elements, rotational bearings 200, a first step bar 130 and a second step bar 120.

The outer housing 110 is configured to have a hollow cylindrical accommodation space. The outer housing 110 is configured to have a hollow cylindrical accommodation space. The outer housing 110 may include a first cover 111 and a second cover 112, which are adapted to block the two ends thereof.

The outer housing 110 includes a support 180 adapted to support ends of the elastic elements, which are elastically deformed when the outer housing 110 and the inner housing 100 are rotated relative to each other.

The first cover 111 may be coupled to the outer housing 110 by means of screw fastening or welding, and may have a through hole 113 formed in the center thereof such that the second step bar 120 passes therethrough to be coupled to the inner housing 100. The inner housing 100 can be rotated together with the second step bar 120.

The second cover 112 is coupled to the first step bar 130 so as to be rotated therewith and is coupled to the outer housing 110 by means of screw fastening or welding. The outer housing 110 can be rotated together with the first step bar 130.

The inner housing 100 is configured to have a diameter smaller than that of the accommodation space in the outer housing 110 such that the inner housing 100 is accommodated in the outer housing 110.

As illustrated in FIG. 2, the inner housing 100 includes elastic element receptors, which are formed in the outer peripheral surface of the inner housing 100 so as to receive the elastic elements. It is obvious that the elastic element receptors may be formed in the inner peripheral surface of the outer housing 110, and the support 180 may be formed on the outer peripheral surface of the inner housing 100.

Figure 3:
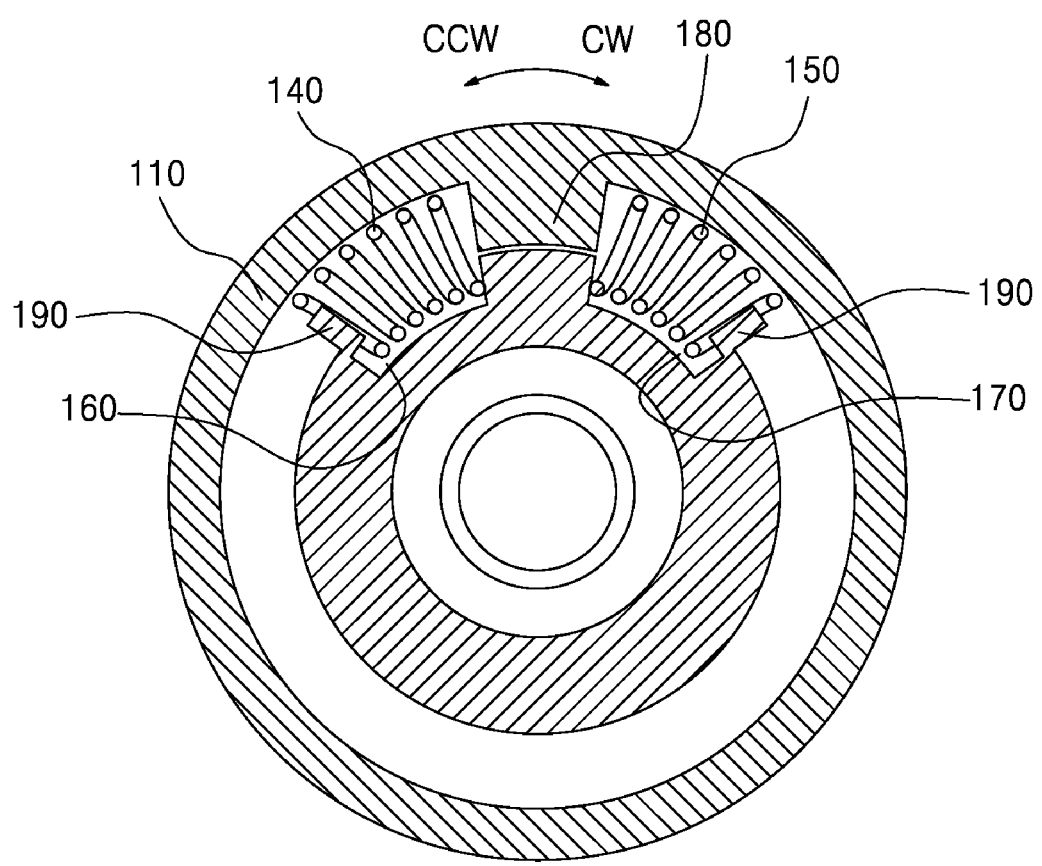
FIG. 3 is a view illustrating the semi-active anti-roll stabilizer bar according to the embodiment of the present invention, in which elastic elements are disposed between an inner housing and an outer housing.

As illustrated in FIG. 3, the elastic element receptors include a first elastic element receptor that is formed in a counterclockwise direction from the support 180 and a second elastic element receptor that is formed in a clockwise direction from the support 180.

The first elastic element receptor includes a first recess 160 such that the two ends of the first elastic element are supported by the first recess 160 and at least a portion of the width of the first elastic element projects radially outwards.

The second elastic element receptor includes a second recess 170 such that the two ends of the second elastic element are supported by the second recess 170 and at least a portion of the width of the second elastic element projects radially outwards.

Each of the first and second recesses 160 and 170 may be formed to such a depth that at least a half of a corresponding one of the elastic elements is embedded in the recess.

The elastic elements are respectively received in the first and second recesses 160 and 170. Consequently, when the outer housing 110 and the inner housing 100 are rotated relative to each other, one of the elastic elements is elastically deformed, thereby exerting elastic force in the direction opposite the rotational direction of the outer housing 110.

The elastic elements include a first coil spring 140, which is compressed by the support 180, thus exerting elastic force in a clockwise direction when the outer housing 110 is rotated in a counterclockwise direction CCW, and a second coil spring 150, which is compressed by the support 180, thus exerting elastic force in the counterclockwise direction when the outer housing 110 is rotated in the clockwise direction. Though, here in this embodiment, the first elastic elements comprise four first coil springs 140 and the second elastic elements comprise four second coil springs 150, the number of springs are not limited.

Referring to FIG. 3, the support 180 is adapted to support only about half of the width of the first coil spring 140 or the second coil spring 150, and the inner housing 100 includes spring holders 190, which are adapted to hold respective distal ends of the first coil spring 140 and the second coil spring 150 opposite the support 180.

When the support 180 presses one end of the coil spring 140 or 150 due to a rotation of the outer housing 110, the whole face of the end is not pressed and thus the compression force applied to the coil spring 140 or 150 is not evenly distributed. The uneven distributed pressing may cause a distortion of the spring 140 or 150 and/or a separation of the spring from the recess 160 or 170. However, by virtue of the spring holders 190, the distortion or separation can be prevented.

Rotational bearings 200 are disposed between the outer housing 110 and the inner housing 100 so as to maintain a predetermined spacing between the outer housing 110 and the inner housing 100 and to rotatably support the outer housing 110 and the inner housing 100 relative to each other. The rotational bearings 200 are respectively disposed at two opposite sides of the outer housing 110 and the inner housing 100.

Figure 4:
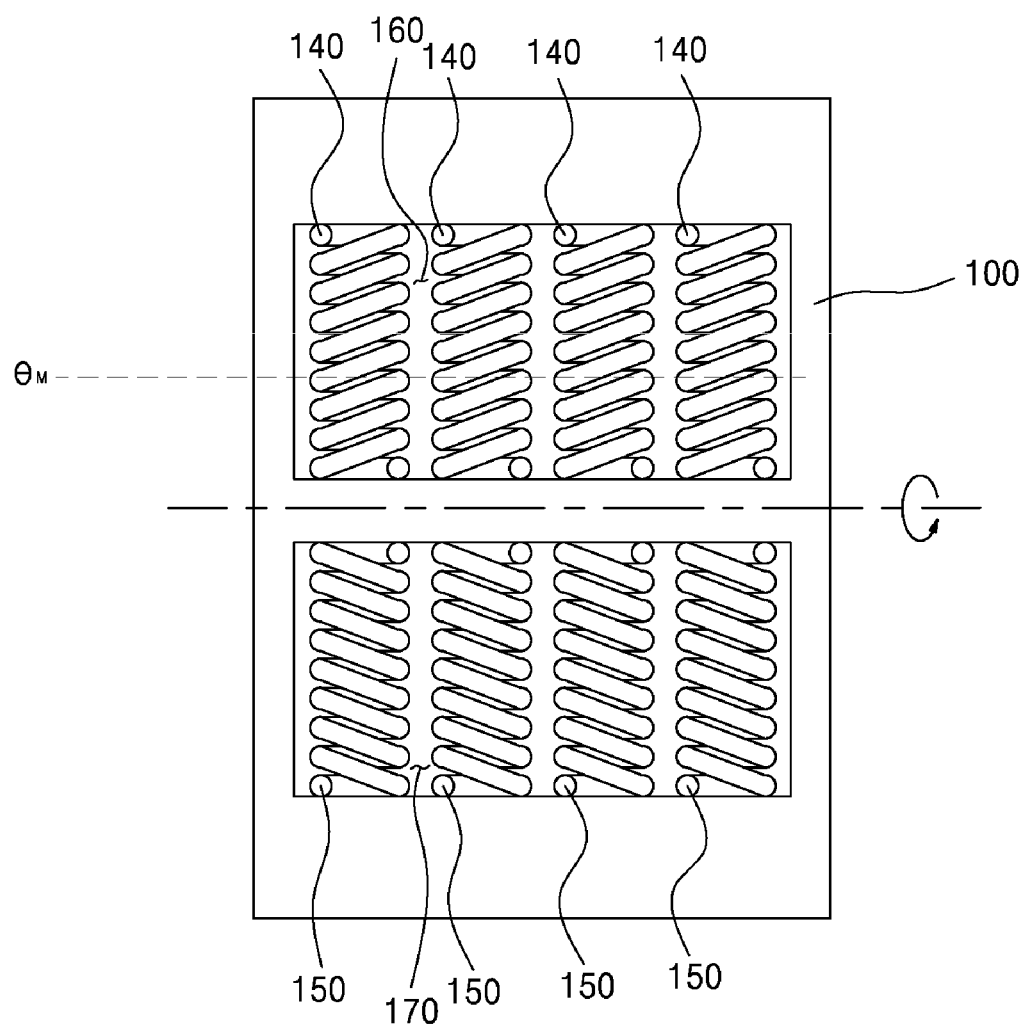
FIG. 4 is a view illustrating the semi-active anti-roll stabilizer bar according to the first embodiment of the present invention, in which the elastic elements are arranged parallel to each other in a first recess and a second recess.
Figure 5:
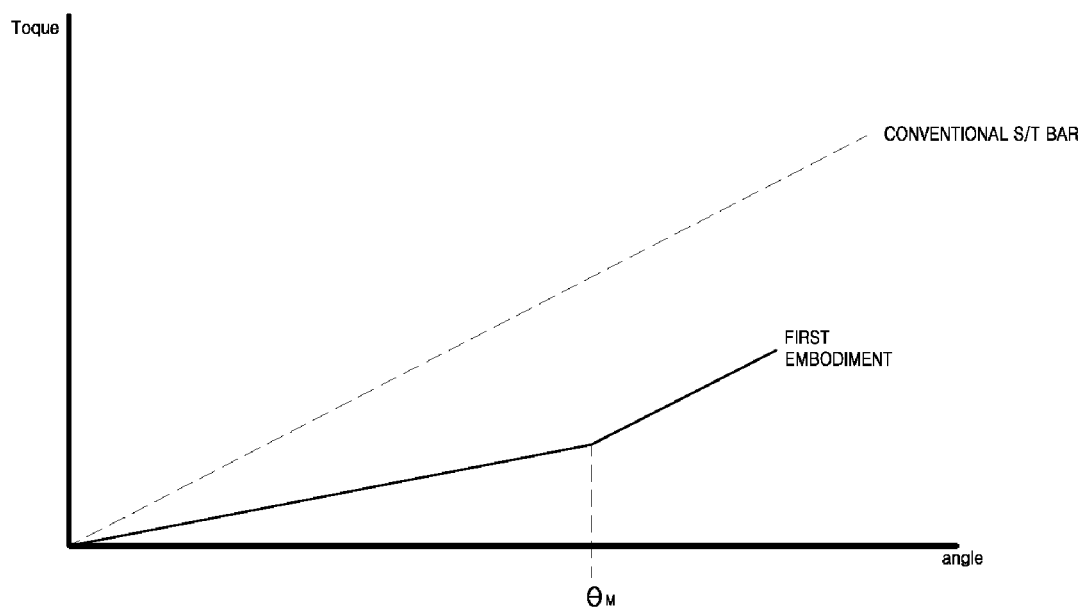
FIG. 5 is a view illustrating variation in the stiffness of the semi-active anti-roll stabilizer bar according to a first embodiment of the present invention when the elastic elements are compressed.

FIG. 4 is a view illustrating an arrangement of the coil springs 140 and 150 according to a first embodiment, and FIG. 5 is a view illustrating roll stiffness (or torsional stiffness), which is generated by the coil springs according to the first embodiment while the coil springs are compressed.

Referring to FIG. 4, when the inner housing 100 is rotated in the clockwise direction CW while the outer housing 110 is rotated in the counterclockwise direction CCW, a plurality of first coil springs 140 are compressed. The graph shown in FIG. 5 gently rises during compression of the first coil springs. When the first coil springs 140 are completely compressed, the first coil springs 140 no longer serve as elastic bodies but serve as rigid bodies with respect to the compressive force, with the result that the torsional stiffness of the first step bar 130 and the second step bar 120 is applied to the stabilizer bar. For this reason, the graph shown in FIG. 5 has a slop almost identical to that of a conventional stabilizer bar from the point $\theta_M$. In other words, lower stiffness is applied before the point $\theta_M$ but stiffness almost equal to that of a conventional stabilizer bar is applied after the point $\theta_M$.

Although the torsional angle of a stabilizer bar mounted on a vehicle may vary during running depending on the kind of vehicle, the torsional angle ranges up to about 18 degrees. Accordingly, the point of $\theta_M$ may be set to be a predetermined angle smaller than 18 degrees such that relatively gentle stiffness is applied by the coil springs 140 and 150 so as to secure a good ride quality until the torsional angle becomes the predetermined angle and the stiffness is increased so as to prevent turnover of the vehicle due to rolling after the torsional angle exceeds the predetermined angle.

The point of $\theta_M$ may be set to be an angle of 15 or 10 degrees.

Considering that the torsional angle of the stabilizer bar during travelling on a level road is only a few degrees, for example 5 degrees or 2 to 3 degrees, the point $\theta_M$ may be designed to correspond to that angle, because it is preferred that the torsional stiffness be mild until the torsion angle reaches that angle.

Figure 6:
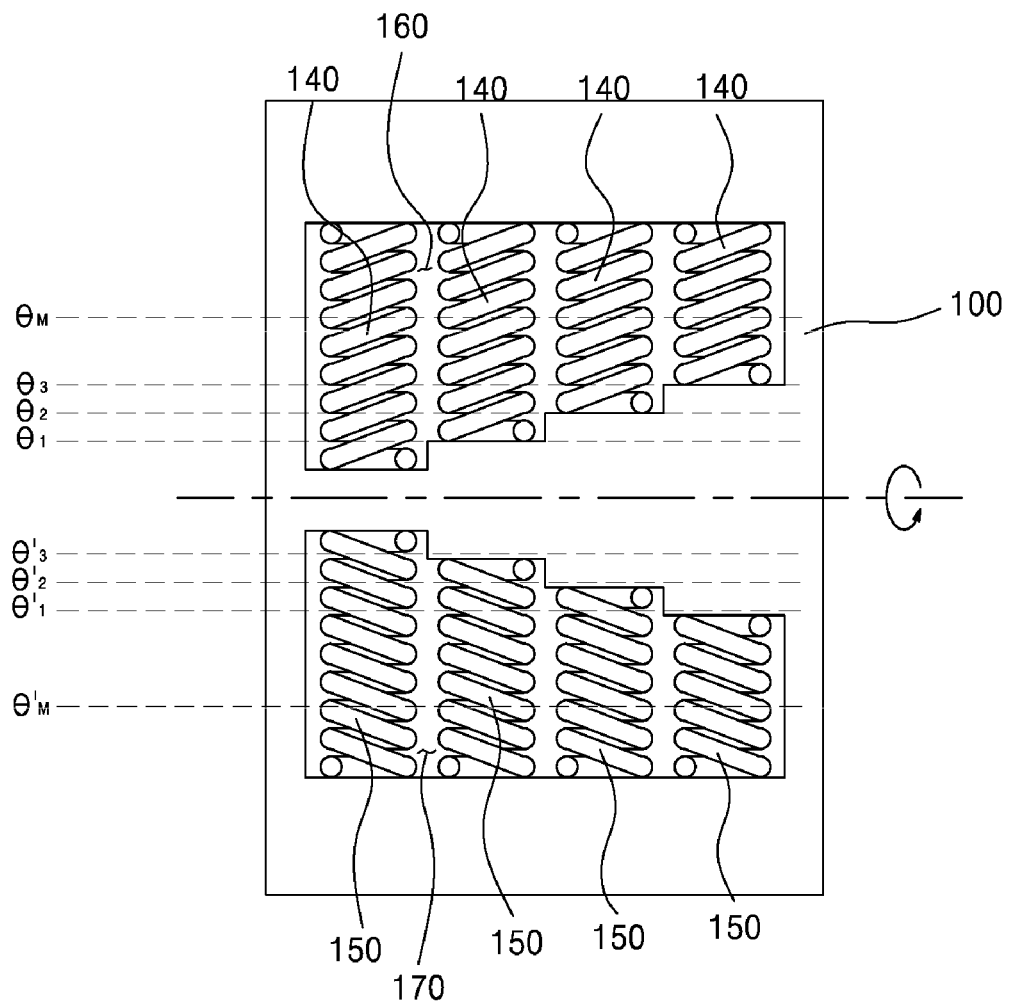
FIG. 6 is a view illustrating a semi-active anti-roll stabilizer bar according to a second embodiment of the present invention, in which the elastic elements, which have different lengths, are arranged parallel to each other in first and second recesses.
Figure 7:
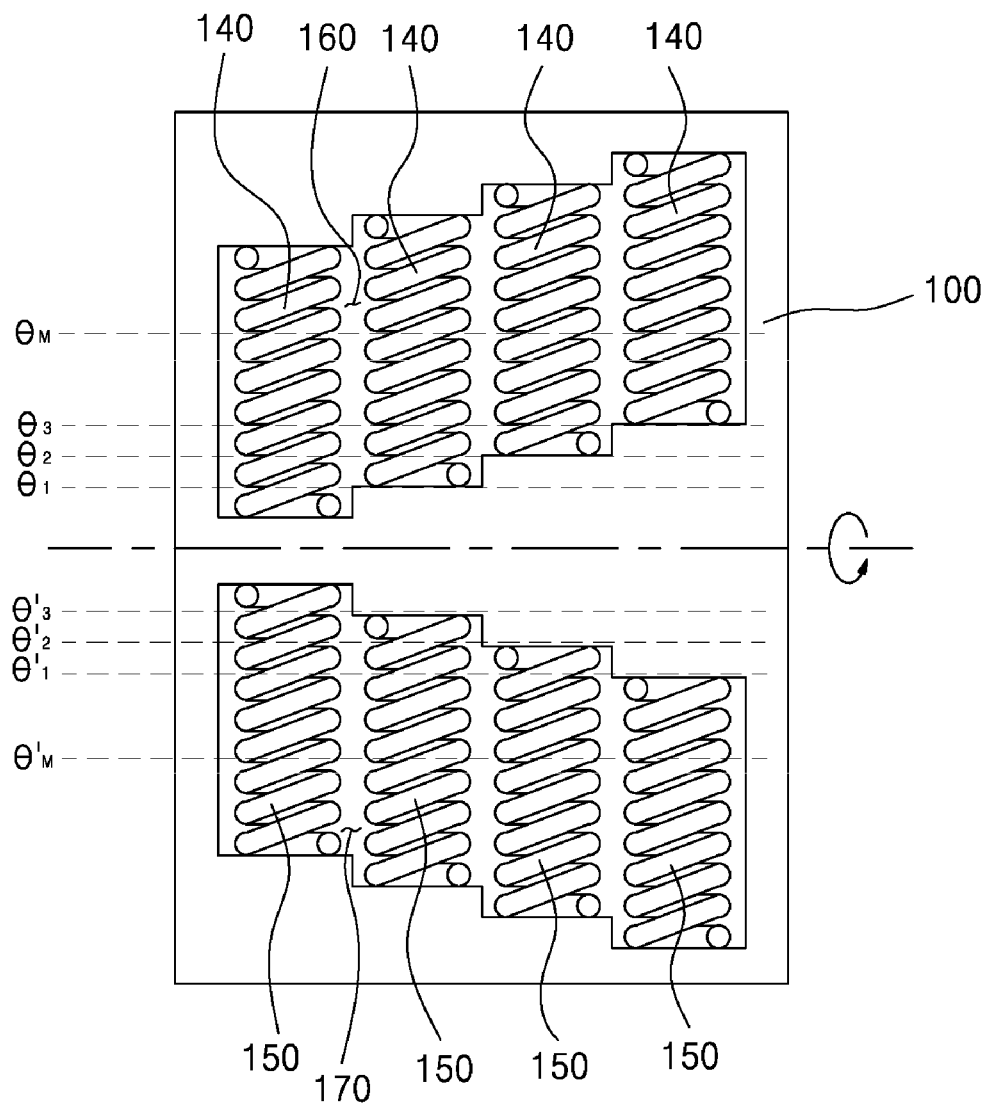
FIG. 7 is a view illustrating a semi-active anti-roll stabilizer bar according to a third embodiment of the present invention, in which the elastic elements, which have the same length, are arranged in first and second recesses in a stepwise fashion.
Figure 8:
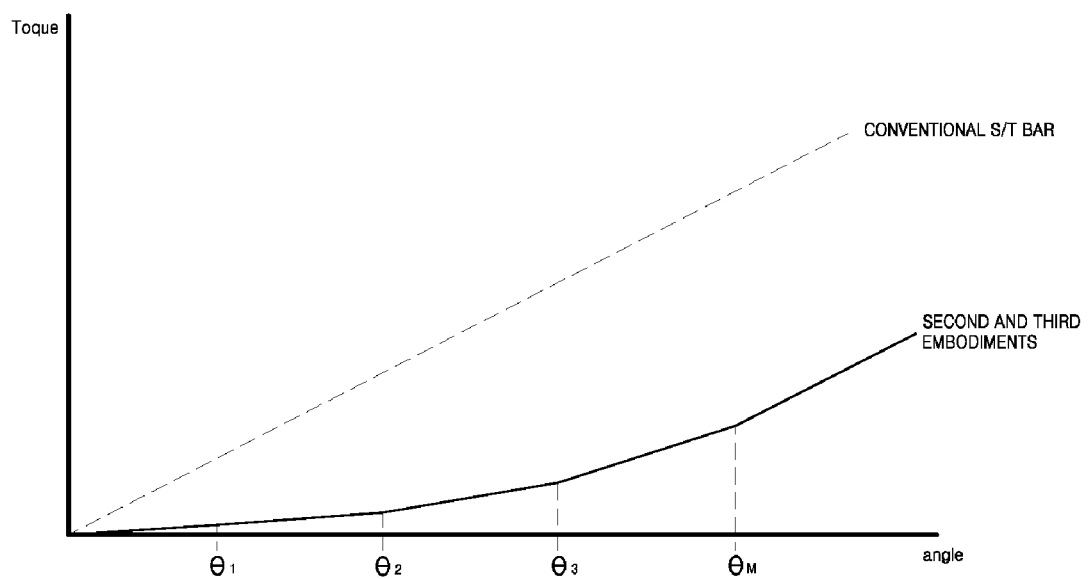
FIG. 8 is a view illustrating variation in the stiffness of the semi-active anti-roll stabilizer bar according to the second and third embodiments of the present invention when the elastic elements are compressed.

FIGS. 6 and 7 are views respectively illustrating an arrangements of coil springs 140 and 150 according to second and third embodiments, and FIG. 8 is a view illustrating the roll stiffness of the coil springs according to these embodiments while the coil springs are compressed.

FIG. 6 illustrates the coil springs 140 and 150, which have different lengths and are arranged parallel to each other, and FIG. 7 illustrates the coil springs 140 and 150, which have the same length and are arranged in a stepwise fashion.

The coil springs 140 and 150 according to the second embodiment, which are shown in FIG. 6, may be configured such that shorter coil springs have the higher stiffness or such that the coil springs have different lengths and the wires of the coil springs have different thicknesses so as to have the same stiffness. The coil springs 140 and 150 according to the third embodiment, which are shown in FIG. 7, may be configured such that the coil springs have the same length and stiffness or such that the coil springs have the same length but have different stiffnesses. Fabrication of the coil springs to the same specification reduces the number of kinds of associated components, thereby reducing production costs and the cost of managing the components.

In the embodiments shown in FIGS. 6 and 7, when the inner housing 100 is rotated in the clockwise direction CW while the outer housing 110 is rotated in the counterclockwise direction CCW, the plurality of first coil springs 140 are compressed in stages by the support 180, which is longitudinally formed throughout the length of the outer housing 110. Specifically, the plurality of first coil springs 140, which are longitudinally arranged parallel to each other, are configured such that the ends thereof that are positioned at the support 180 are respectively spaced apart from the support 180 by δ1, δ2 and δ3. Consequently, as the support 180 is rotated, the support 180 sequentially comes into contact with the first coil springs 140 at θ1, θ2 and θ3, thereby increasing the stiffness in stages. As a result, the roll stiffness is increased in stages, as illustrated in FIG. 8.

Also in the second and third embodiments, when the first coil springs 140 are completely compressed, the first coil springs 140 serve as rigid bodies, and thus torsional stiffness is applied on the stabilizer bar. Consequently, the graph shown in FIG. 8 varies so as to have the same slope as that of a conventional stabilizer bar from the point $\theta_M$.

Figure 9:
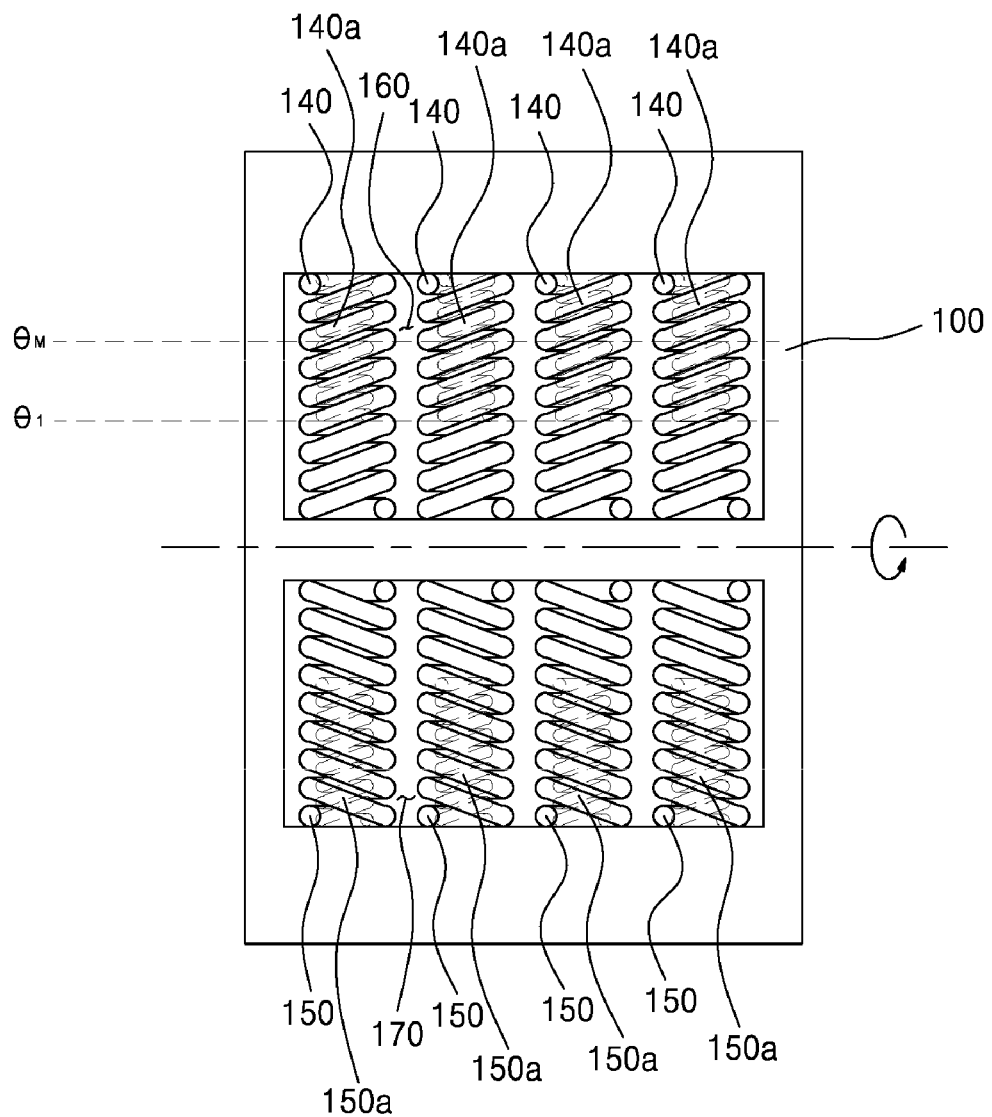
FIG. 9 is a view illustrating a semi-active anti-roll stabilizer bar according to a fourth embodiment of the present invention, in which smaller elastic elements are disposed in larger elastic elements.
Figure 10:
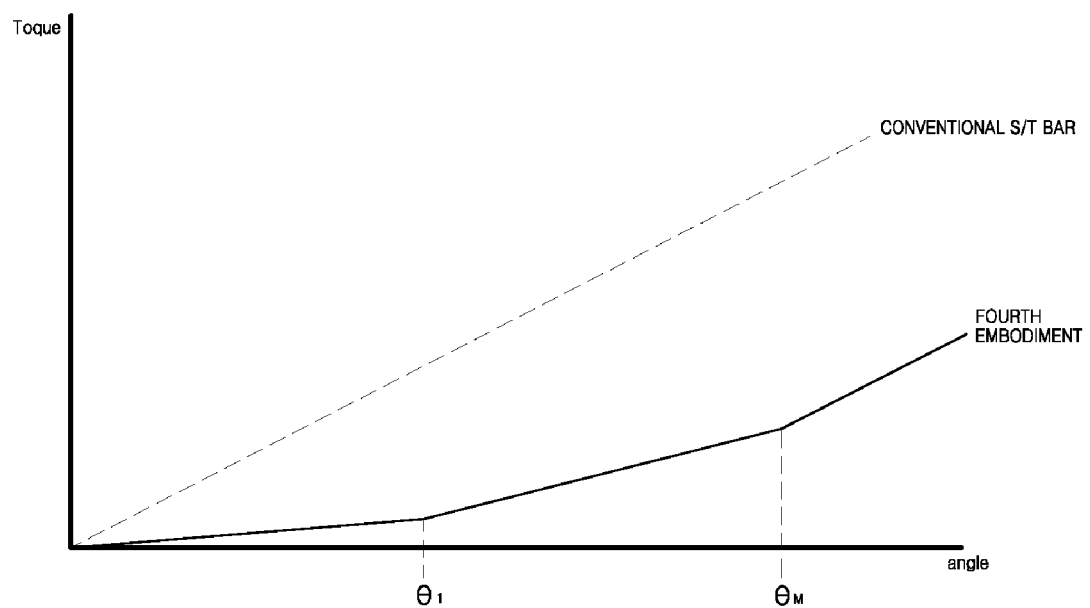
FIG. 10 is a view illustrating variation in the stiffness of the semi-active anti-roll stabilizer bar according to the fourth embodiment of the present invention when the elastic elements are compressed.

FIG. 9 is a view illustrating the arrangement of the coil spring 140 and 150 and smaller coil springs 140a and 150a, which are disposed in the coil springs 140 and 150, according to a fourth embodiment, and FIG. 10 is a view illustrating roll stiffness that is generated in the coil springs 140 and 150 according to the fourth embodiment when the coil springs 140 and 150 are compressed.

As illustrated in FIG. 9, the fourth embodiment is constructed such that the multiple inner coil springs 140a and 150a are disposed in respective ones among the multiple outer coil springs 140 and 150. Consequently, when the outer coil springs 140 are compressed alone and are then compressed together with the inner coil springs 140a, the stiffness is further increased, thereby increasing the roll stiffness in stages. Referring to FIG. 10, it is noted that the repulsive torque is gently increased because only the outer coil springs are compressed before the point of θ1 and that the repulsive torque is more steeply increased by virtue of the increase in elastic force due to the inner coil springs after the point θ1. After the point $\theta_M$, the stabilizer bar exhibits the same stiffness as that of a conventional stabilizer bar, as in the above description.

Although one inner coil spring 140a is disposed in each of the outer coil springs 140 in this embodiment, a plurality of inner coil springs 140a, which have different sizes, may be disposed in each of the outer coil springs 140 in a telescoping manner in other embodiments.

Since the procedure in which the second coil springs 150 are compressed is identical to that of the first coil springs 140, a detailed description thereof is omitted.

The stiffness in each of the zone up to θ1, the zone up to θ2 and the zone up to θ3 in each of the second, third and further embodiments (i.e., the gradient in each of the zone up to θ1, the zone up to θ2 and the zone up to θ3 in FIGS. 8 and 10) may be lower than that in the zone up to $\theta_M$ in the first embodiment (i.e., the gradient in the zone up to $\theta_M$ in FIG. 5). Accordingly, the torsional stiffness of the stabilizer bar in each of the second, third and fourth embodiments while travelling on a level road is decreased compared to the first embodiment, thereby improving ride quality.

In embodiments other than the above embodiments, the stiffness in each of the zones up to θ1, θ2 and θ3, the stiffness in each of the zones up to θ1 and θ2 or the stiffness in the zone up to θ1 may be, of course, designed to be higher than the stiffness in the zone up to $\theta_M$ in the first embodiment.

Furthermore, although coil springs, which can be compressed, are used in the above embodiments, it goes without saying that tension springs, which are adapted to exert elastic force when pulled, may also be provided in place of the coil springs. Since the structure of tension springs will be readily apparent to those skilled in the art, a detailed description thereof is omitted.

As is apparent from the above description, the semi-active anti-roll stabilizer bar according to the present invention, which is constructed in the above-described manner, provides an effect of controlling roll stiffness without an additional electric actuator.

In addition, when the stabilizer bar is rotated during general travel, the stabilizer bar has roll stiffness attributable to the repulsive force due to the spring constant thereof. When the stabilizer bar is greatly rotated during turning of the vehicle, the springs are closely compressed, with the result that the stabilizer bar has the same high stiffness as that of a general stabilizer bar.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A semi-active anti-roll stabilizer bar comprising:
    an outer housing having a hollow cylindrical accommodation space therein;
    an inner housing disposed in the accommodation space;
    at least one elastic element, which is elastically deformed when the outer housing and the inner housing are rotated relative to each other;
    a rotational bearing disposed between the outer housing and the inner housing;
    a first step bar, which is connected at one end thereof to one wheel of a vehicle and is connected at the other end thereof to the outer housing; and
    a second step bar, which is connected at one end thereof to the other opposite wheel of the vehicle and is connected at the other end thereof to the inner housing,
    wherein one of the outer housing and the inner housing includes at least one elastic element receptor adapted to receive the elastic element and a remaining one of the outer housing and the inner housing includes a support,
    wherein, when the elastic element is elastically deformed between the outer housing and the inner housing, one end of the elastic element is supported by the support and the other end of the elastic element is supported by the elastic element receptor,
    wherein the elastic element receptor includes a first elastic element receptor disposed in a counterclockwise direction from the support and a second elastic element receptor disposed in a clockwise direction from the support, wherein the elastic element includes a first elastic element, which is disposed in the first elastic element receptor and which is compressed by the support thereby applying elastic force in the clockwise direction when the outer housing is rotated in the counterclockwise direction, and a second elastic element, which is disposed in the second elastic element receptor and which is compressed by the support thereby exerting elastic force in the counterclockwise direction when the outer housing is rotated in the clockwise direction, wherein each of the first and second elastic elements includes a plurality of elastic elements arranged in a longitudinal direction of the inner housing, wherein ends of the plurality of first elastic elements that face the support are spaced apart from the support at different angles or distances, and wherein ends of the plurality of second elastic elements that face the support are spaced apart from the support at different angles or distances.

2. A semi-active anti-roll stabilizer bar comprising:
an outer housing having a hollow cylindrical accommodation space therein;
an inner housing disposed in the accommodation space;
at least one elastic element, which is elastically deformed when the outer housing and the inner housing are rotated relative to each other;
a rotational bearing disposed between the outer housing and the inner housing;
a first step bar, which is connected at one end thereof to one wheel of a vehicle and is connected at the other end thereof to the outer housing; and
a second step bar, which is connected at one end thereof to the other opposite wheel of the vehicle and is connected at the other end thereof to the inner housing,
wherein one of the outer housing and the inner housing includes at least one elastic element receptor adapted to receive the elastic element and a remaining one of the outer housing and the inner housing includes a support,
wherein, when the elastic element is elastically deformed between the outer housing and the inner housing, one end of the elastic element is supported by the support and the other end of the elastic element is supported by the elastic element receptor,
wherein the elastic element receptor includes a first elastic element receptor disposed in a counterclockwise direction from the support and a second elastic element receptor disposed in a clockwise direction from the support, wherein the elastic element includes a first elastic element, which is disposed in the first elastic element receptor and which is compressed by the support thereby applying elastic force in the clockwise direction when the outer housing is rotated in the counterclockwise direction, and a second elastic element, which is disposed in the second elastic element receptor and which is compressed by the support thereby exerting elastic force in the counterclockwise direction when the outer housing is rotated in the clockwise direction, and
wherein the first or second elastic element includes an outer coil spring and an inner coil spring disposed in the outer coil spring.

3. The semi-active anti-roll stabilizer bar according to claim 1, wherein the ends of the plurality of first elastic elements that face the support are disposed in a stepwise fashion such that the plurality of first elastic elements are compressed one by one when the support is rotated in the counterclockwise direction, and wherein the ends of the plurality of second elastic elements that face the support are disposed in a stepwise fashion such that the plurality of second elastic elements are compressed one by one when the support is rotated in the clockwise direction.

4. The semi-active anti-roll stabilizer bar according to claim 3, wherein the plurality of first elastic elements have the same length, and the other opposite ends of the plurality of first elastic elements are also disposed in a stepwise fashion, and wherein the plurality of second elastic elements have the same length, and the other opposite ends of the plurality of second elastic elements are also disposed in a stepwise fashion.

5. A semi-active anti-roll stabilizer bar comprising:
an outer housing having a hollow cylindrical accommodation space therein;
an inner housing disposed in the accommodation space;
at least one elastic element, which is elastically deformed when the outer housing and the inner housing are rotated relative to each other;
a rotational bearing disposed between the outer housing and the inner housing;
a first step bar, which is connected at one end thereof to one wheel of a vehicle and is connected at the other end thereof to the outer housing; and
a second step bar, which is connected at one end thereof to the other opposite wheel of the vehicle and is connected at the other end thereof to the inner housing,
wherein one of the outer housing and the inner housing includes at least one elastic element receptor adapted to receive the elastic element and a remaining one of the outer housing and the inner housing includes a support,
wherein, when the elastic element is elastically deformed between the outer housing and the inner housing, one end of the elastic element is supported by the support and the other end of the elastic element is supported by the elastic element receptor,
wherein the elastic element receptor includes a first elastic element receptor disposed in a counterclockwise direction from the support and a second elastic element receptor disposed in a clockwise direction from the support, wherein the elastic element includes a first elastic element, which is disposed in the first elastic element receptor and which is compressed by the support thereby applying elastic force in the clockwise direction when the outer housing is rotated in the counterclockwise direction, and a second elastic element, which is disposed in the second elastic element receptor and which is compressed by the support thereby exerting elastic force in the counterclockwise direction when the outer housing is rotated in the clockwise direction,
wherein the first elastic receptor includes a first recess, which is configured such that both ends of the first elastic element are supported inside the first recess and at least a portion of the first elastic element in a width direction projects radially outwards from the inner housing, and
wherein the second elastic receptor includes a second recess, which is configured such that both ends of the second elastic element are supported inside the second recess and at least a portion of the second elastic element in a width direction projects radially outwards from the inner housing.

* * * * *